United States Patent [19]

Sprague et al.

[11] Patent Number: 5,422,814
[45] Date of Patent: Jun. 6, 1995

[54] GLOBAL POSITION SYSTEM RECEIVER WITH MAP COORDINATE SYSTEM OUTPUTS

[75] Inventors: David S. Sprague, Portola Valley; Anil Tiwari, Palo Alto; Arthur Woo, Cupertino, all of Calif.

[73] Assignee: Trimble Navigation Limited, Sunnyvale, Calif.

[21] Appl. No.: 143,281

[22] Filed: Oct. 25, 1993

[51] Int. Cl.⁶ .............................................. G06F 165/00
[52] U.S. Cl. ....................................... 364/449; 364/448; 364/444; 364/460; 342/357
[58] Field of Search ............... 364/449, 444, 448, 460; 342/357, 451, 457; 340/995

[56] References Cited

U.S. PATENT DOCUMENTS

| | | | |
|---|---|---|---|
| 4,977,509 | 11/1990 | Pitchford et al. | 364/449 |
| 4,991,126 | 2/1991 | Reiter | 364/561 |
| 5,266,958 | 11/1993 | Durboraw, III | 342/357 |
| 5,337,242 | 8/1994 | Yamamoto et al. | 364/449 |

OTHER PUBLICATIONS

Catalog: U.S. Cavalry; Spring 1994; p. 2 "Scout GPS (M.G.R.S.)"; Trimble Navigation.

*Primary Examiner*—Michael Zanelli
*Attorney, Agent, or Firm*—Thomas E. Schatzel

[57] ABSTRACT

An embodiment of the present invention comprises a GPS receiver including a conversion table memory index for storing latitude-longitude lookup conversions to standardized map coordinates and scale factors.

8 Claims, 4 Drawing Sheets

GLOBAL POSITION SYSTEM RECEIVER WITH MAP COORDINATE SYSTEM OUTPUTS

BACKGROUND OF THE INVENTION

1. Field of the Invention

The invention relates generally to navigation and more specifically to equipment and methods for finding ones position on a map with the aid of a global positioning system receiver.

2. Description of the Prior Art

Global positioning system (GPS) receivers conventionally output position indications in terms of longitude and latitude. Relating that information to a road map, atlas or topographic map has been difficult for lay people, and errors in understanding one's real position relative to a map are frequently made.

Topographical map users need a quick and easy method to determine and record their precise position on any topographical (TOPO) series map. Such maps have a datum located somewhere on the map, such as at a bottom right corner, e.g., the south east corner, that provides the latitude and longitude at that point. The map further provides a scale factor that can be used to convert, for example, inches on the map to miles over the terrain. Users could benefit from a system that could provide position information in any one of several different formats, starting from four inputs consisting of a datum input, a scale factor, and the horizontal and vertical distances on the map from the datum. A GPS receiver that provided current position information from a user selected reference point, such as the south-east datum of a map page, would be useful if inches "over and up" from the datum were displayed on the GPS receiver's screen.

Besides the longitude-latitude format, other formats for position identification include universal transverse mercader (UTM), Maidenhead, TRIMBLE GRID LOCATOR TM, OSGB and Thomas Brothers TM Maps. Maidenhead is a system used by the world's amateur radio operators to describe locations in alternating sequences of two letters followed by two digit numbers. Each pair adds precision to the position description, and Maidenhead coordinates can be readily communicated over radio channels, even when the reception is poor. TRIMBLE GRID LOCATOR (TGL) is a proprietary map coordinate system marketed by Trimble Navigation (Sunnyvale, Calif.) for use with GPS receivers. The TRIMBLE ATLAS is based upon the North American Datum, 1927 (AND 27).

A regional map of the United States is provided in atlas form for the TGL system and provides a regional map scale of one inch to thirty miles and an area map scale of one inch to five miles. Table I lists the nine regions of the United States.

TABLE I

| |
|---|
| Region 1: Pacific Northwest |
| Region 2: Mountain |
| Region 3: North Central |
| Region 4: Great Lakes |
| Region 5: Northeast |
| Region 6: Pacific Southwest |
| Region 7: Four Corners |
| Region 8: South Central |
| Region 9: Southeast |

Area pages following each regional section provide close-up views of selected metropolitan areas, and show an entire street network. For example, San Jose, Calif., is shown on a page identified "R6 263" for region six, area page 263. On that page in the atlas, grid coordinates are provided A-L left to right, and 1-11 top to bottom. The San Jose International Airport (SJC) can be seen as being located in grid J5, area page 263, R6. This could alternatively be expressed as "R6,263,J5".

Each page and grid location can be sub-divided into nine equal sub-grids, such as in Table II. This allows for greater resolution in pinpointing a given location. In the example, SJC is located in sub-grid "UR", making it, "R6,263,J5,UR".

TABLE II

| UL | UC | UR |
|---|---|---|
| ML | MC | MR |
| LL | LC | LR |

The abbreviations used for the nine equal sub-grids are expanded in Table III.

TABLE III

| | |
|---|---|
| UL | Upper Left |
| UC | Upper Center |
| UR | Upper Right |
| ML | Middle Left |
| MC | Middle Center |
| MR | Middle Right |
| LL | Lower Left |
| LC | Lower Center |
| LR | Lower Right |

Given the prior art, it would be difficult to find one's position using such an atlas, given only longitude-latitude information, such as is provided by a conventional GPS receiver. A GPS receiver that would display TGL information directly for a user's position would be more useful.

GPS receivers conventionally provide for input of a series of waypoints on a path to a goal destination. Off-track information is typically provided real time to inform a user how far off, left or right, the actual track is off from the ideal track. Such information is not very useful to hikers who are more concerned with what their heading should be, with regard to where they are presently. A target tracking display on a GPS receiver is needed to show users their current position, relative to their goal destination. A distance and speed indication would also be useful.

SUMMARY OF THE PRESENT INVENTION

It is therefore an object of the present invention to provide a GPS receiver that can output a user's position relative to a map coordinate system.

It is another object of the present invention to provide a GPS receiver that can indicate a target track to a goal destination in terms of direction orientation signals, e.g., left, right or turn around signals to a user.

Briefly, a GPS receiver embodiment of the present invention comprises a GPS receiver including a conversion table memory index for storing latitude-longitude lookup conversions to standardized map coordinates and scale factors.

An advantage of the present invention is that a GPS receiver is provided that assists a user in finding a position in terms of a common map coordinate system.

Another advantage of the present invention is that a GPS receiver is provided that indicates in real time the direction a user should proceed to reach a goal destination, rather than how far off an ideal track that one is at any one point.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
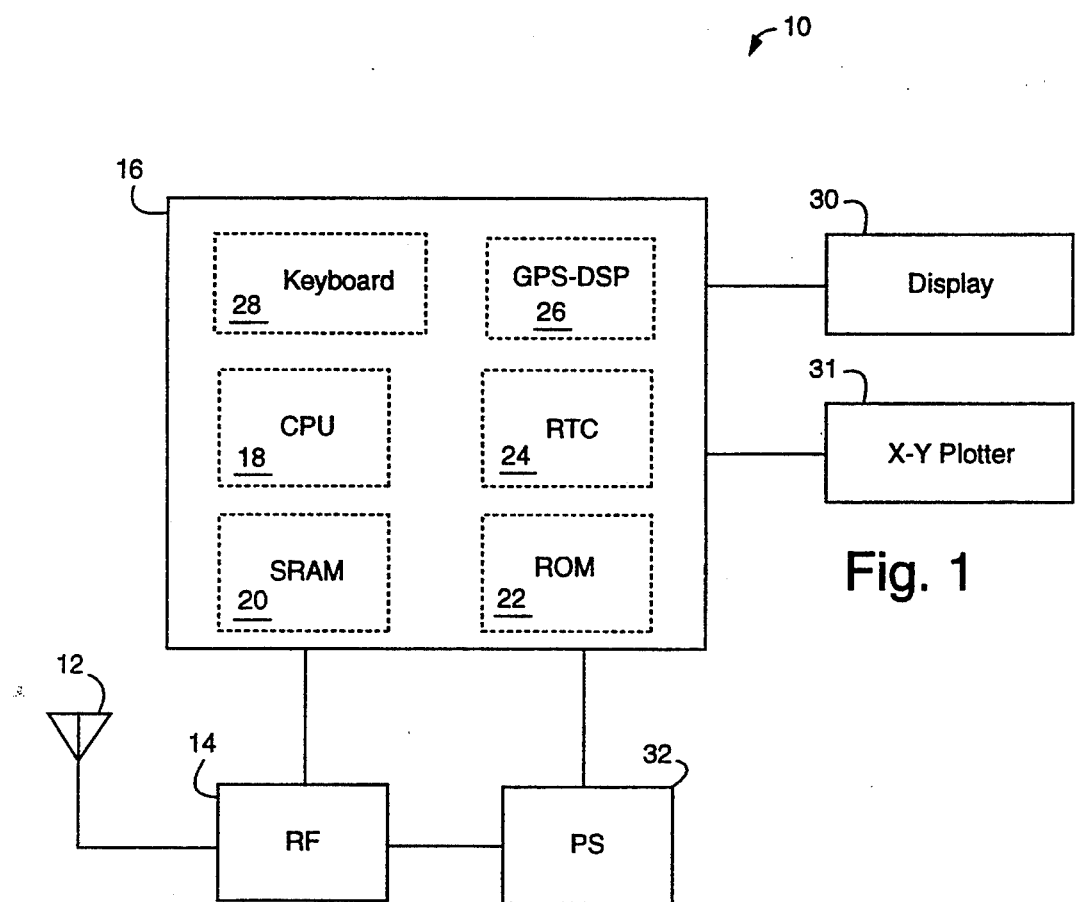
FIG. 1 is a block diagram of a GPS receiver embodiment of the present invention.
Figure 2:
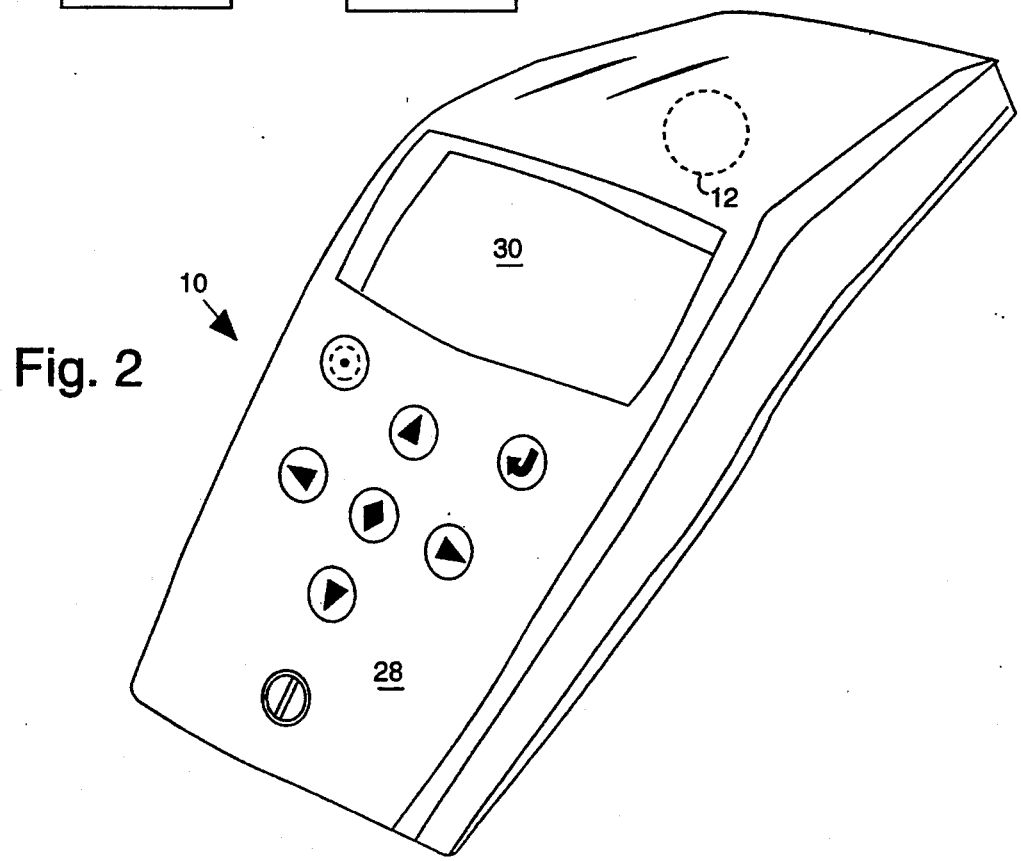
FIG. 2 is a perspective view of the GPS receiver of FIG. 1.

FIG. 1 illustrates a global positioning system (GPS) receiver embodiment of the present invention, referred to herein by the general reference numeral 10. GPS receiver 10 comprises an antenna 12 to receive radio signals from orbiting GPS satellites, a radio frequency (RF) stage 14 to amplify and downconvert such GPS radio signals and a navigation computer 16.

Navigation computer 16 includes a microprocessor (CPU) 18, a static random access memory (SRAM) 20, a read only memory (ROM) 22, a real time clock (RTC) 24 and a GPS digital signal processor (GPS-DSP) 26. CPU 18 is preferably a Motorola type 68000. SRAM 20 has a capacity of 64K bytes and ROM 22 stores eight megabytes.

ROM 22 has machine code programmed into it that embodies an operating system to communicate with a keyboard 28 and a display 30 for interaction with a user. An X-Y chart recorder 31 is alternatively connected to the navigation computer 16 and provides for a hard copy printout of a path traveled by the GPS receiver 10 over a period of time.

A power supply (PS) 32 powers GPS receiver 10 and may include a battery for portable use and an adapter, e.g., a cigarette lighter adapter for use in an automobile.

The operating system causes RF 14 to tune to selected GPS satellites and to direct CPU 18 to demodulate their respective signals to obtain range information. GPS-DSP 26 is controlled to produce navigation fixes each second in an X,Y,Z coordinate system that is aligned to the earth at the equator, poles and Greenwich, England (prime meridian). Such computations of X,Y,Z and the hardware to support them are conventional and may be obtained commercially, for example the GPS receiver marketed as SCOUT by Trimble Navigation (Sunnyvale, Calif.) may be used.

Figure 3:
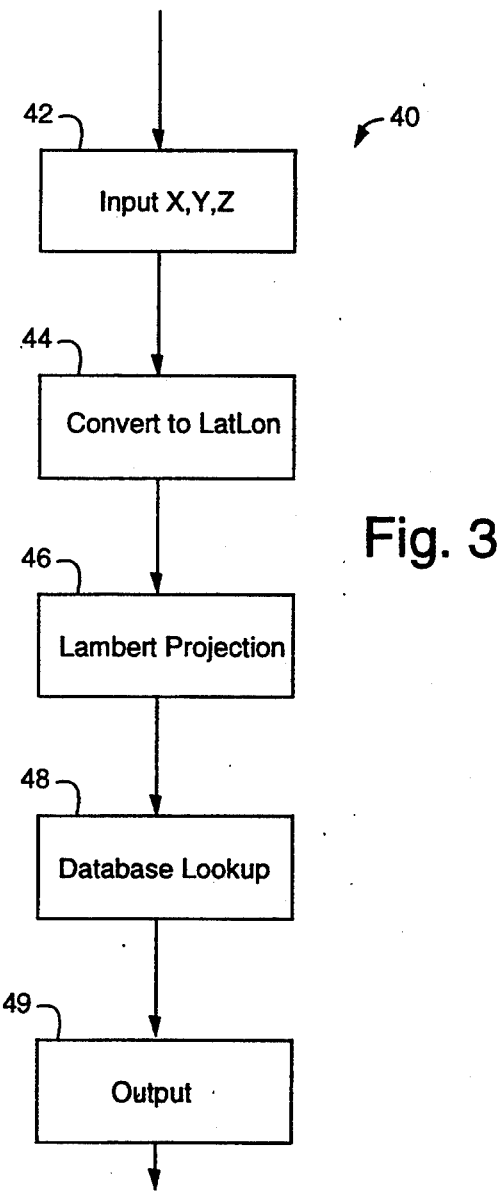
FIG. 3 is a flowchart diagram of a computer-implemented method of atlas map conversion included in the GPS receiver of FIG. 1.

ROM 22 further includes an application program 40, diagrammed in FIG. 3, that converts the X,Y,Z coordinate information to one or more different coordinate styles in real time each second, or on demand. These coordinate styles include the ordinate system of Great Britain (OSGB), universal transverse mercader (UTM), Thomas Brothers map page and grid, Trimble Atlas, and topographical map "over and up" where map scales and datums may be input at keyboard 28. The coordinate styles may be selected by a user through keyboard 28 and are output on display 30.

Application program 40 may include a computer-implemented method that uses the Thomas Brothers map coordinate style for an output to display 30. A step 42 inputs an X,Y,Z position update every second from GPS-DSP 26. A step 44 converts the X,Y,Z data into standard latitude-longitude (LatLon) coordinates. A step 46 does a Lambert conformal projection to project the three-dimensional X,Y,Z and LatLon information into two-dimensional X,Y information because maps are flat, single plane approximations of the earth's contour. ROM 22 stores a database that correlates X,Y information to particular regional map pages, area map pages and detail map pages in the Thomas Brothers map atlases. Such a database may be manually assembled by deriving positional information from each page of a published Thomas Brothers map, or the data may be supplied by Thomas Brothers Maps (Irvine, Calif.) under a proprietary license arrangement. The database is indexed in a lookup action in a step 48. A map page and grid representation is output on display 30 in a step 49.

Figure 4:
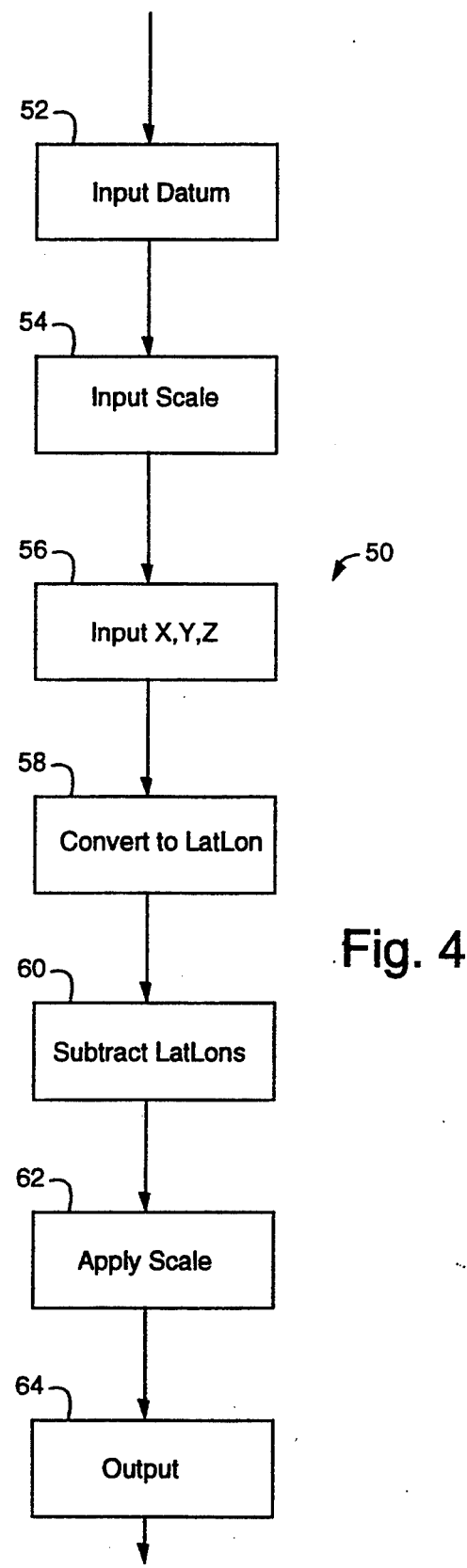
FIG. 4 is a flowchart diagram of a computer-implemented method for "over and up" map conversion for the GPS receiver of FIG. 1.

Application program 40 may also include a computer-implemented method 50 that allows a map's south-east corner datum to be entered together with scale information. This provides an output to display 30 that shows the distance, e.g., inches or centimeters, "over and up" from the datum that a user is located on the map page. As illustrated in FIG. 4, a step 52 inputs a datum from a user through keyboard 28 in latitude and longitude terms that represent the south-east corner of the corresponding map page, e.g., as LatLon$_{datum}$. For example, the United States Geological Survey (USGS) publishes such maps with latitude and longitude provided for a bottom right-hand corner datum. A step 54 inputs a map scale from a user through keyboard 28 in terms of map centimeters to actual meters or kilometers. A step 56 inputs an X,Y,Z position update every second from GPS-DSP 26. A step 58 converts the X,Y,Z data into standard latitude-longitude (LatLon) coordinates, e.g., as LatLon$_{fix}$. A step 60 subtracts LatLon$_{datum}$ from LatLon$_{fix}$, which yields a difference in degrees latitude and in degrees longitude. In a step 62, the distance on the earth's surface represented by the degrees of latitude and the degrees of longitude at the position fix are divided by the scale factor that was input in step 54. An indication to a user is output in a step 64 to display 30 informing the user how many inches or centimeters the user's position is on the map entered from the datum provided.

Figure 5:
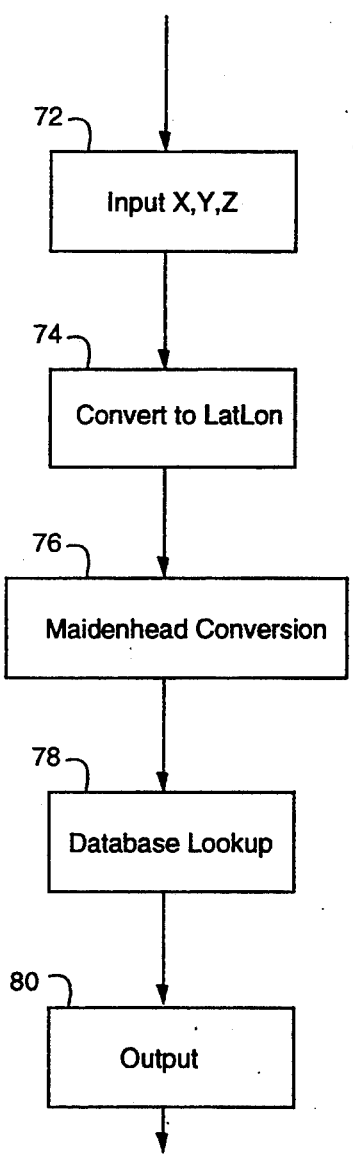
FIG. 5 is a flowchart diagram of a computer-implemented method of Maidenhead map conversion included in the GPS receiver of FIG. 1.

Application program 40 may include a computer-implemented method 70 that uses the Maidenhead coordinate style for an output to display 30. As illustrated in FIG. 5, a step 72 inputs an X,Y,Z position update every second from GPS-DSP 26. A step 74 converts the X,Y,Z data into standard latitude-longitude (LatLon)

coordinates. A step 76 projects the three-dimensional X,Y,Z and LatLon information into two-dimensional Maidenhead grid system information. ROM 22 stores a database that correlates X,Y and LatLon information to particular Maidenhead grid locations. Such a database may be manually assembled by deriving positional information from each grid. The database is indexed in a lookup action in a step 78. A Maidenhead position representation is output on display 30 in a step 80 that represents the current position of GPS receiver 10 and the user holding it.

Figure 6:
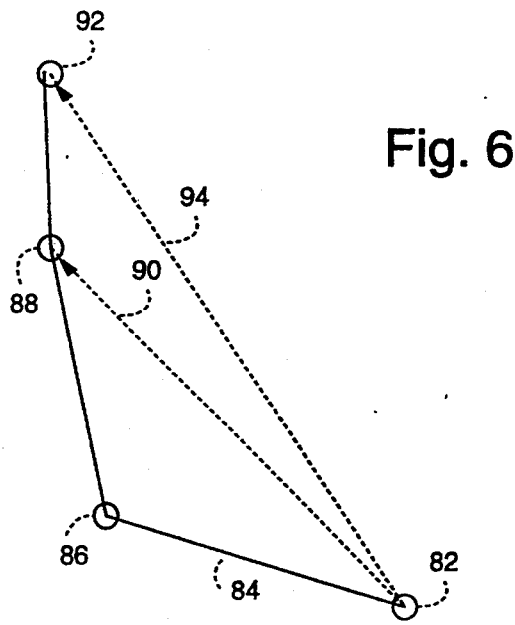
FIG. 6 is a diagram of waypoints and target tracks from a current user position.

Application program 40 may further include a computer-implemented method for target tracking goals and waypoints. FIG. 6 illustrates a current user's true position 82. A track 84 indicates the path to a waypoint 86. GPS receiver 10 displays direction orientation signals, e.g., "left", "right" or "turnaround" indications on display 30 to guide a user directly to waypoint 86, regardless of whether the users subsequent positions deviate from track 84. Prior art devices generally guide a user back to track 84, rather than waypoint 86. At anytime, GPS receiver 10 can be set to operate with a next waypoint 88, by an entry at keyboard 28. In that case, display 30 will provide left, right and turnaround information relative to a track 90. Similarly, a still further waypoint 92 may be targeted by using a track 94. Waypoint 86, for example, does not have to be passed by the user from point 82 before waypoints 88 and 92 can be used. Conversely, a user may back track between waypoints and reverse course completely.

Figure 7:
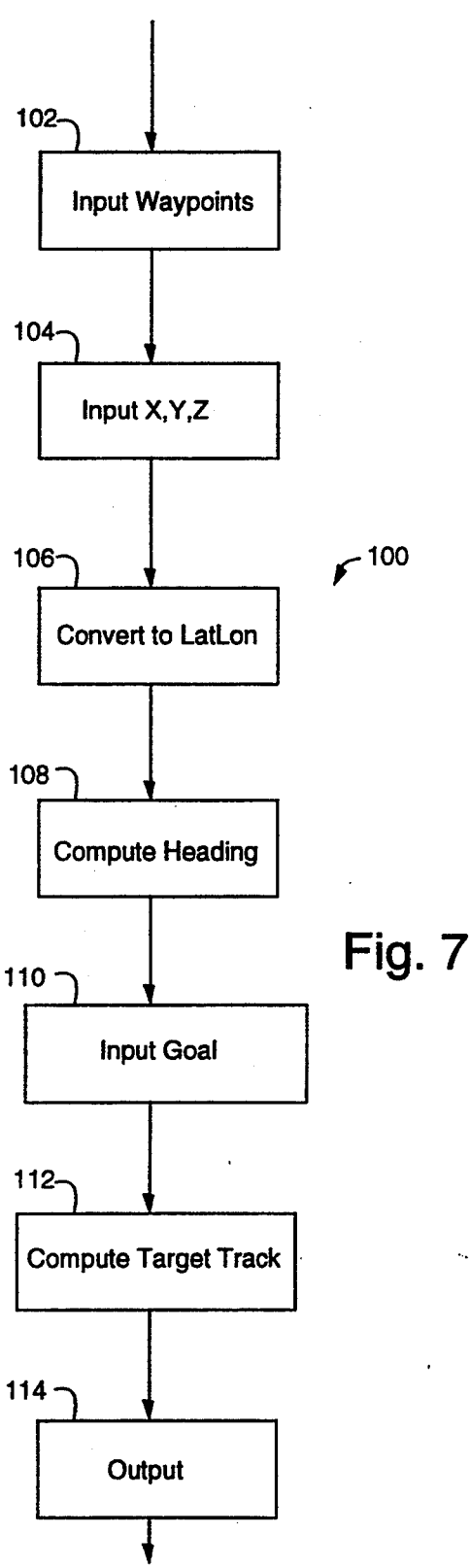
FIG. 7 is a flowchart diagram of a computer-implemented method target tracking as in FIG. 6 and included in the GPS receiver of FIG. 1.

FIG. 7 illustrates a computer-implemented target tracking program 100 that may be included in application 40 to provide the waypointing and tracking described in connection with FIG. 6. A step 102 accepts waypoint information from a user through keyboard 28, e.g., in latitude-longitude, as a plurality of LatLon$_{waypoints}$. A step 104 inputs an X,Y,Z position update every second from GPS-DSP 26. A step 104 converts the X,Y,Z data into standard latitude-longitude (LatLon) coordinates, e.g., as LatLon$_{fix}$. A step 108 computes a user heading (vector) from a history of LatLon$_{fix}$ determinations. A memory can be used to store such a history, e.g., SRAM 20 (FIG. 1). A step 110 inputs a user select of which waypoint is to be used as a goal from keyboard 28 and is termed LatLon$_{goal}$. A step 112 computes a vector to LatLon$_{goal}$ from the current LatLon$_{fix}$ and compares this vector to the heading obtained in step 108. A step 114 outputs a "left", "right" or "turnaround" indication on display 30 according to the results obtained in step 112.

Figure 8:
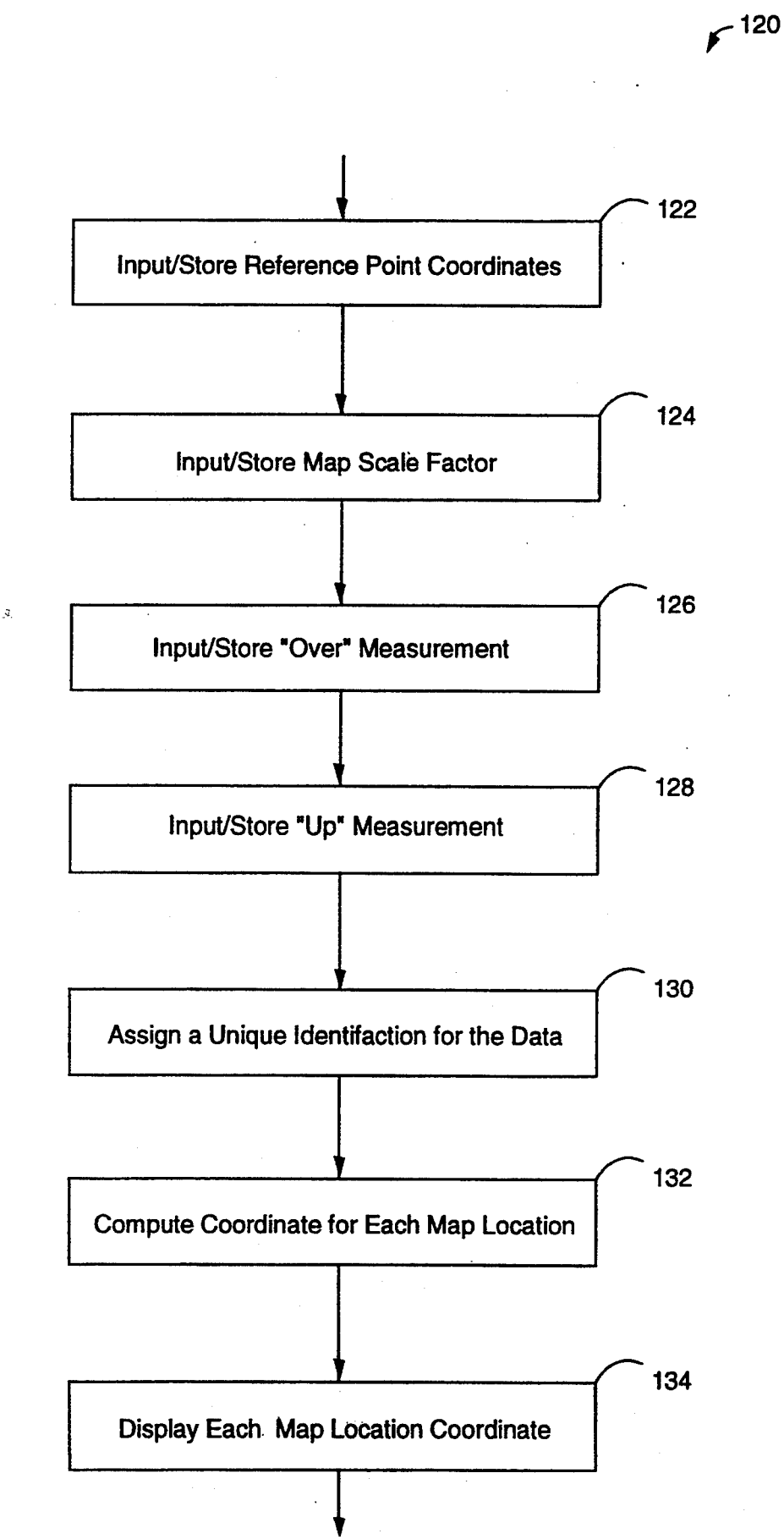
FIG. 8 is a flowchart of a method of locating a position on a map in earth coordinates by inputting data related to the map's scale and offset measurements from a datum stated in earth coordinates.

FIG. 8 illustrates a method 120, according to the present invention, for locating a position on a map in earth coordinates by inputting data related to the map's scale and offset measurements from a datum stated in earth coordinates. A GPS receiver, such as GPS receiver 10 in FIG. 1, may be used in the steps of method 120, which converts map measurement units measured "over and up" from a designated map reference point (datum), into position information that is named and stored in a memory within the GPS receiver. Thereafter, various locations can be called up to the display, such as display 30, in one of several standard coordinate styles, e.g., latitude/longitude, UTM, Maidenhead, TRIMBLE GRID LOCATOR TM (Trimble Navigation, Ltd.), OSGB or coordinates used to index into Thomas Brothers Maps publications. A step 122 requests and stores a reference point into the memory of the GPS receiver. For example, many topographical maps provided by the government of the United States include a call-out of the latitude/longitude for a corner of a particular section represented in a map, e.g., the south-east corner (bottom-right). A step 124 requests and stores a map scale factor into the memory of the GPS receiver. For example, map scales of 1:20,000, 1:24,000, 1:25,000, 1:50,000, 1:62,500, 1:63,360, 1:100,000, 1:125,720, 1:150:000, and 1:500,000 may be provided on a conventional menu display, together with provisions for one or more custom scale factors. A step 126 requests and stores a horizontal measurement on the map "over" from the reference point into the memory of the GPS receiver. Such a measurement may be in inches or centimeters, for example. A step 128 requests and stores a vertical measurement on the map "up" from the reference point into the memory of the GPS receiver. Such a measurement may also be in inches or centimeters. A step 130 assigns a unique name and/or number to identify the newly created "over and up" location so that it may be distinguished from subsequent entries. A step 132 computes the respective locations for corresponding reference points, map scales and over and up measurements for expression in a standard coordinate style for a user. A step 134 outputs to a display for the user each "over and up" map location in a selected coordinate style with its unique identifying name and/or number.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A global positioning system (GPS) receiver, comprising:

radio frequency (RF) stage connected to an antenna for receiving radio signals from orbiting navigation satellites and for amplifying and down converting said radio signals;

a navigation computer connected to the RF stage for providing a current position fix from range information in said radio signals;

a database of geographical map coordinates for a plurality of geographical region, area and detail map pages in a hard copy map atlas that relate to their respective page and grid identifications;

database map indexing means connected to the database and the navigation computer for converting a position fix obtained from the navigation computer into a map page and grid reference; and output means connected to the database map indexing means for displaying said map page and grid reference.

2. The GPS receiver of claim 1, further comprising:

input means for accepting a plurality of waypoints and a designation of one of said waypoints as a goal from a user;

history means connected to the navigation computer for collecting a series of current position fixes from the navigation computer;

heading means connected to the history means for deriving a user course vector of a user from the history means;

target track means connected to the input means and the heading means for comparing the heading to said waypoint selected as a goal and said user course vector; and display means connected to the target track means for indicating to a user with the output means a direction orientation to proceed on to said goal.

3. The GPS receiver of claim 1, further comprising:

input means for accepting a coordinate for a datum related to a particular hard copy map and for accepting a scale associated with said map from a user;

position differencing means connected to the input means and the navigation computer for subtracting said datum from said current position fix obtained by the navigation computer and finding a coordinate difference;

scale application means connected to the input means and position differencing means for converting said coordinate difference into a map "over and up" dimension using said scale input by the input means; and display means connected to the scale application means and position differencing means for indicating to a user with the output means a measure on said map over and up from said datum that represents a user's current position on said map.

4. A global positioning system (GPS) receiver, comprising:

a radio frequency (RF) stage connected to an antenna for receiving radio signals from orbiting navigation satellites and for amplifying and down converting said radio signals;

a navigation computer connected to the RF stage for providing a current position fix from range information in said radio signals;

inputs means for accepting a coordinate for a datum related to a particular hard copy map and for accepting a scale associated with said map from a user;

position differencing means connected to the input means and the navigation computer for subtracting said datum from said current position fix obtained by the navigation computer and finding a coordinate difference;

scale application means connected to the position differencing means for converting said coordinate difference into a map "over and up" dimension using said scale input by the input means; and display means connected to the position differencing means and scale application means for indicating to said user a measure on said map over and up from said datum that represents a user's current position on said map.

5. A global positioning system (GPS) receiver, comprising:

a radio frequency (RF) stage connected to an antenna for receiving radio signals from orbiting navigation satellites and for amplifying and down converting said radio signals;

a navigation computer connected to the RF stage for providing a current position fix from range information in said radio signals;

a database of map coordinates for a plurality of region, area and detail map pages in a hard copy map atlas that relate to their respective page and grid identifications;

database map indexing means connected to the database and the navigation computer for converting a position fix obtained from the navigation computer into a map page and grid reference;

output means connected to the database map indexing means for displaying said map page and grid reference;

first input means for accepting a plurality of waypoints and a designation of one of said waypoints as a goal;

history means connected to the navigation computer for collecting a series of current position fixes from the navigation computer;

heading means connected to the history means for deriving a course vector of a user from the position fixes;

target track means connected to the heading means and first input means for comparing the heading to said waypoint selected as a goal and said user course vector;

display means connected to the navigation computer for indicating to a user with the output means a direction orientation to proceed on to said goal;

second input means for accepting a coordinate for a datum related to a particular hard copy map and for accepting a scale associated with said map;

position differencing means connected to the navigation computer and the second input means for subtracting said datum from said current position fix obtained by the navigation computer and finding a coordinate difference;

scale application means connected to the position differencing means and the second input means for converting said coordinate difference into a map "over and up" dimension using said scale input by the input means; and display means connected to the scale application means for indicating to a user a measure on said map over and up from said datum that represents a user's current position on said map.

6. The GPS receiver of claim 5, wherein:

the navigation computer includes a microprocessor connected to a static random access memory (SRAM), a read only memory (ROM), a real time clock (RTC), a GPS digital signal processor and a computer-implemented program for the database of map coordinates, the database map indexing means, the history means, the heading means, the target track means, the position differencing means and the scale application means.

7. The GPS receiver of claim 6, further including:

an X-Y chart recorder connected to the navigation computer and providing for a hard copy printout of a path just traveled by said GPS receiver over a period of time.

8. A method of informing a user of the user's position represented on a printed, published map where the scale of the map is known and a reference point on the map has its position identified, the method comprising the steps of:

requesting said user to input at a keyboard of a navigation satellite receiver a value representing said scale of the map, wherein said navigation satellite receiver comprises an antenna to receive radio signals from orbiting navigation satellites, a radio frequency stage to amplify and downconvert such radio signals and a navigation computer for estimating a position of said navigation satellite receiver, in terms of three-dimensional XYZ earth coordinates, from said radio signals;

storing said value representing said scale of the map in a random access memory as a map scale value;

requesting said user to input at said keyboard of said navigation satellite receiver a set of values representing said reference point on the map;

storing said values representing said reference point on the map in said random access memory as a reference point value;

determining in said navigation computer a current position estimate for said navigation satellite receiver in three-dimensional XYZ earth coordinates;

converting said current position estimate from said three-dimensional XYZ earth coordinates to a coordinate system, without an altitude value, to a set of values that corresponds to a coordinate system included in said set of values representing said reference point on the map;

subtracting said set of values representing said current position estimate from said set of values representing said reference point on the map;

multiplying said map scale value by a value representing a longitudinal difference obtained in the step of subtracting between said current position estimate and said reference point to obtain a horizontal ruler measure related to a point on said map from said reference point that corresponds to said current position estimate;

multiplying said map scale value by a value representing a latitudinal difference obtained in the step of subtracting between said current position estimate and said reference point to obtain a vertical ruler measure related to a point on said map from said reference point that corresponds to said current position estimate;

displaying said horizontal and vertical ruler measures to said user; and manually plotting on said map said point that corresponds to said current position estimate with said horizontal and vertical ruler measures from said reference point.

* * * * *